United States Patent
Kuriyama

(10) Patent No.: US 7,599,693 B2
(45) Date of Patent: Oct. 6, 2009

(54) CELL SEARCH METHOD AND MOBILE COMMUNICATION TERMINAL

(75) Inventor: Takahiro Kuriyama, Tokyo (JP)

(73) Assignee: NEC Corporation, Tokyo (JP)

( * ) Notice: Subject to any disclaimer, the term of this patent is extended or adjusted under 35 U.S.C. 154(b) by 207 days.

(21) Appl. No.: 11/224,235

(22) Filed: Sep. 13, 2005

(65) Prior Publication Data

US 2006/0068782 A1    Mar. 30, 2006

(30) Foreign Application Priority Data

Sep. 28, 2004   (JP) ............................. 2004-282241

(51) Int. Cl.
*H04B 15/00*   (2006.01)
(52) U.S. Cl. ................. 455/434; 455/435.1; 455/435.3; 455/515
(58) Field of Classification Search ................. 455/434, 455/435.1, 450, 452.1, 512, 437, 432.1, 513, 455/435.3, 515, 435.2, 422.1, 447; 370/329, 370/328, 331–332, 338
See application file for complete search history.

(56) References Cited

U.S. PATENT DOCUMENTS

| | | | | |
|---|---|---|---|---|
| 5,896,572 A * | 4/1999 | Scotton | ................... | 455/452.1 |
| 5,903,832 A * | 5/1999 | Seppanen et al. | ........ | 455/435.3 |
| 6,192,224 B1 * | 2/2001 | Grayson et al. | .......... | 455/168.1 |
| 6,298,235 B1 * | 10/2001 | Bamburak et al. | .......... | 455/434 |
| 6,393,006 B1 | 5/2002 | Kajihara | | |
| 6,961,569 B2 * | 11/2005 | Raghuram et al. | ........ | 455/435.1 |
| 7,062,271 B2 * | 6/2006 | Choi | ........................... | 455/434 |
| 7,096,016 B2 * | 8/2006 | Hasegawa | ................... | 455/434 |
| 2003/0236079 A1 | 12/2003 | Hasegawa | | |
| 2004/0224684 A1 * | 11/2004 | Dorsey et al. | ............... | 455/434 |
| 2005/0143082 A1 * | 6/2005 | Yang | ........................ | 455/452.1 |

FOREIGN PATENT DOCUMENTS

| | | |
|---|---|---|
| CN | 1277421 C | 8/2004 |
| EP | 0 948 226 A2 | 10/1999 |
| EP | 1 524 871 A2 | 4/2005 |
| JP | 2000-333259 A | 11/2000 |
| JP | 2003-348648 | 12/2003 |
| WO | WO 2004/010719 A1 | 1/2004 |

* cited by examiner

*Primary Examiner*—George Eng
*Assistant Examiner*—Brandon J Miller
(74) *Attorney, Agent, or Firm*—Foley & Lardner LLP

(57) ABSTRACT

A mobile communication terminal according to the present invention includes: a receiver for receiving a signal from a base station via an antenna; a cell search section for searching for a cell of a desired network; a cell storage section for storing information about a frequency that is used by the network; and a cell search control section for controlling the cell search section and the cell storage section. The cell storage section stores a plurality of predetermined frequency bands that can be searched. The cell search control section controls the cell search section to search for frequencies in the frequency bands according to a predetermined priorities. A cell search method according to the present invention includes: assigning priorities to the frequency bands according to a predetermined rule; and performing a cell search for a cell belonging to a desired network according to the priorities.

4 Claims, 8 Drawing Sheets

CELL SEARCH METHOD AND MOBILE COMMUNICATION TERMINAL

BACKGROUND OF THE INVENTION

1. Field of the Invention

The present invention relates to a cell search method and a mobile communication terminal, and more particularly to a cell search method for accessing a network that uses the Wideband Code Division Multiple Access (W-CDMA) system and to a mobile communication terminal that performs the cell search.

2. Description of the Related Art

In a mobile communication system that uses the Code Division Multiple Access (CDMA) system, a radio zone identified with a frequency and Code forms a single communication area (cell) When a plurality of common carriers run their respective Public Land Mobile Networks (PLMNs), each common carrier uses one or two or more frequencies that a reassigned thereto. For example, according to the 3rd Generation Partnership Project (3GPP), the frequency band (FB) of CDMA radio signals from radio base stations to mobile communication terminals is 60 MHz wide, ranging from 2110 MHz to 2170 MHz. Center frequencies can be set at intervals of 200 KHz within a range from 2112.4 MHz to 2167.6 MHz. The number of possible center frequencies is therefore 277, so a search for all available frequencies takes a considerable time. While the available frequency band will be further expanded in the future, shortening the time required to detect frequencies is therefore demanded.

FIGS. 1A and 1B show examples of frequencies used in PLMNs. In the area A shown in FIG. 1A, the PLMN-A of a common carrier A adopts a frequency F01 and the PLMN-B of a common carrier B adopts frequencies F11 and F12. When a mobile communication terminal is connected to the PLMN-A in the area A, the mobile communication terminal stores F01 as a frequency of the PLMN-A. When the mobile communication terminal enters a no service area, e.g., an elevator, the communication with the radio base station is interrupted. However, when the mobile communication terminal stays within the area A, the mobile communication terminal is capable of easily restarting the communication with the radio base station by using the stored frequency F01. When the mobile communication terminal has moved from the area A to an area B, the mobile communication terminal is unable to communicate with a base station of the PLMN-A by using the frequency F01. When the PLMN-A adopts frequencies F02 and F03 in the area B of FIG. 1B, detecting the frequencies F02 and F03 usually requires sequentially searching for all frequencies. Such frequency detecting processing takes a long time and consumes increased power. Also, while the mobile communication terminal searches for all frequencies, the mobile communication terminal may detect, with high received field strengths, frequencies F11 and F13 that are adopted by the PLMN-B. In this case, the mobile communication terminal obtains notifying information sent from a radio base station in order to check the PLMN of the cells of the detected frequencies. In such a case, recovering the communication with the desired PLMN-A takes a still longer time. Such a long-time cell search process considerably affects the time required to become ready for communication after power-on, the time required for the mobile communication terminal to recover from a no service area to a service area, and the time required to recover communication after detection of desynchronization or a state being out of synchronization.

For example, JP2003-348648 A discloses a high-speed cell search method. In this method, the electric power distribution in the whole frequency band is measured and frequency bands to be searched are limited and ranked. A search based on the conditions is conducted to tentatively select a cell. JP 2000-333259 A discloses a technique in which a mobile station limits the number of frequency channels to be scanned in a single scan operation and changes part of the frequency channels for each scan operation.

However, with the known techniques above, when a mobile station detects a frequency having a high received field strength, the mobile station obtains notifying information sent from a radio base station in order to check the PLMN of the cell of that frequency. This considerably increases the time required for the mobile station to recover communication with the desired PLMN.

SUMMARY OF THE INVENTION

An object of the present invention is to provide a cell search method and a mobile communication terminal for a mobile communication system in which a plurality of networks are run, which are capable of quickly detecting a cell that belongs to a particular network.

The present invention provides a cell search method for use in a mobile terminal that stores a plurality of predetermined frequency bands. The method includes: assigning priorities to the frequency bands according to a predetermined rule; and performing a cell search for a cell belonging to a desired network according to the priorities.

The present invention provides another cell search method for use in a mobile communication terminal that stores a plurality of predetermined frequency bands. The method includes: searching for a cell by using a frequency stored in the mobile communication terminal; searching for another frequency in the frequency band that contains the frequency when no cell belonging to a desired network is detected; searching for further another frequency in another frequency band that is adjacent to the frequency band when no cell belonging to the desired network is detected; and searching for still further another frequency in further another frequency band that is adjacent to the another frequency band when no cell belonging to the desired network is detected.

A mobile communication terminal according to the present invention includes: a transmitter/receiver for communicating with a base station via an antenna; a cell search section for searching for a cell of a network; a cell information storage section for storing information about a frequency that is used by the network; and a cell search control section for controlling the cell search section. The cell information storage section stores a plurality of predetermined frequency bands. The cell search control section controls the cell search section to search for a frequency in the frequency bands according to a predetermined priorities.

According to the present invention, in a mobile communication system in which a plurality of networks use a plurality of frequencies, a mobile communication terminal is capable of quickly detecting a cell that belongs to a particular network and hence reducing the power consumption.

BRIEF DESCRIPTION OF THE DRAWINGS

The above and other objects, features and advantages of the present invention will become apparent form the following detailed description when taken with the accompanying drawings in which.

DETAILED DESCRIPTION OF THE PREFERRED EMBODIMENTS

Figure 1A:
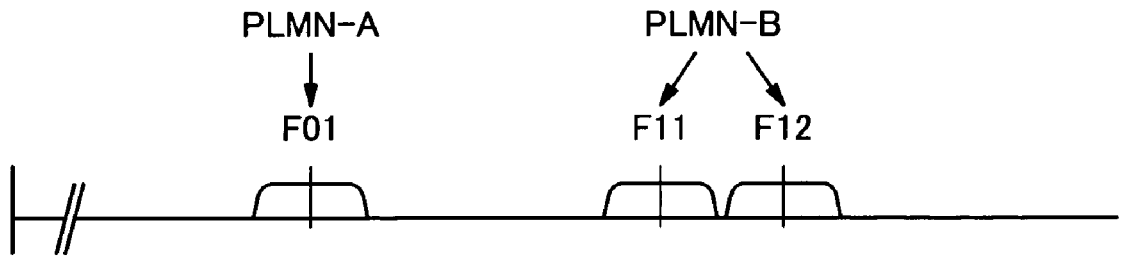
FIGS. 1A and 1B show examples of frequencies that are used by a plurality of networks.
Figure 1B:
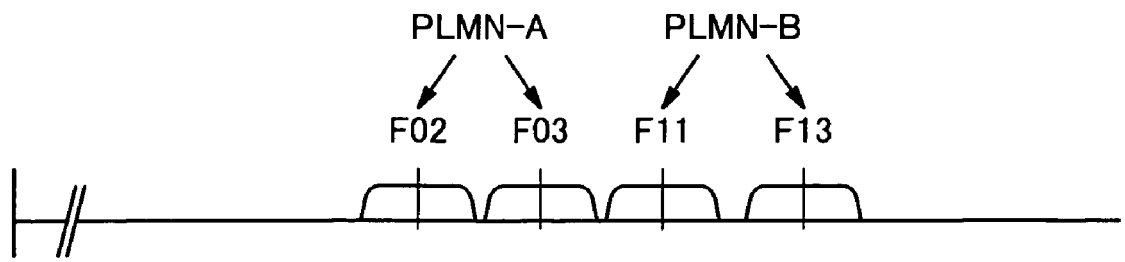
Figure 2:
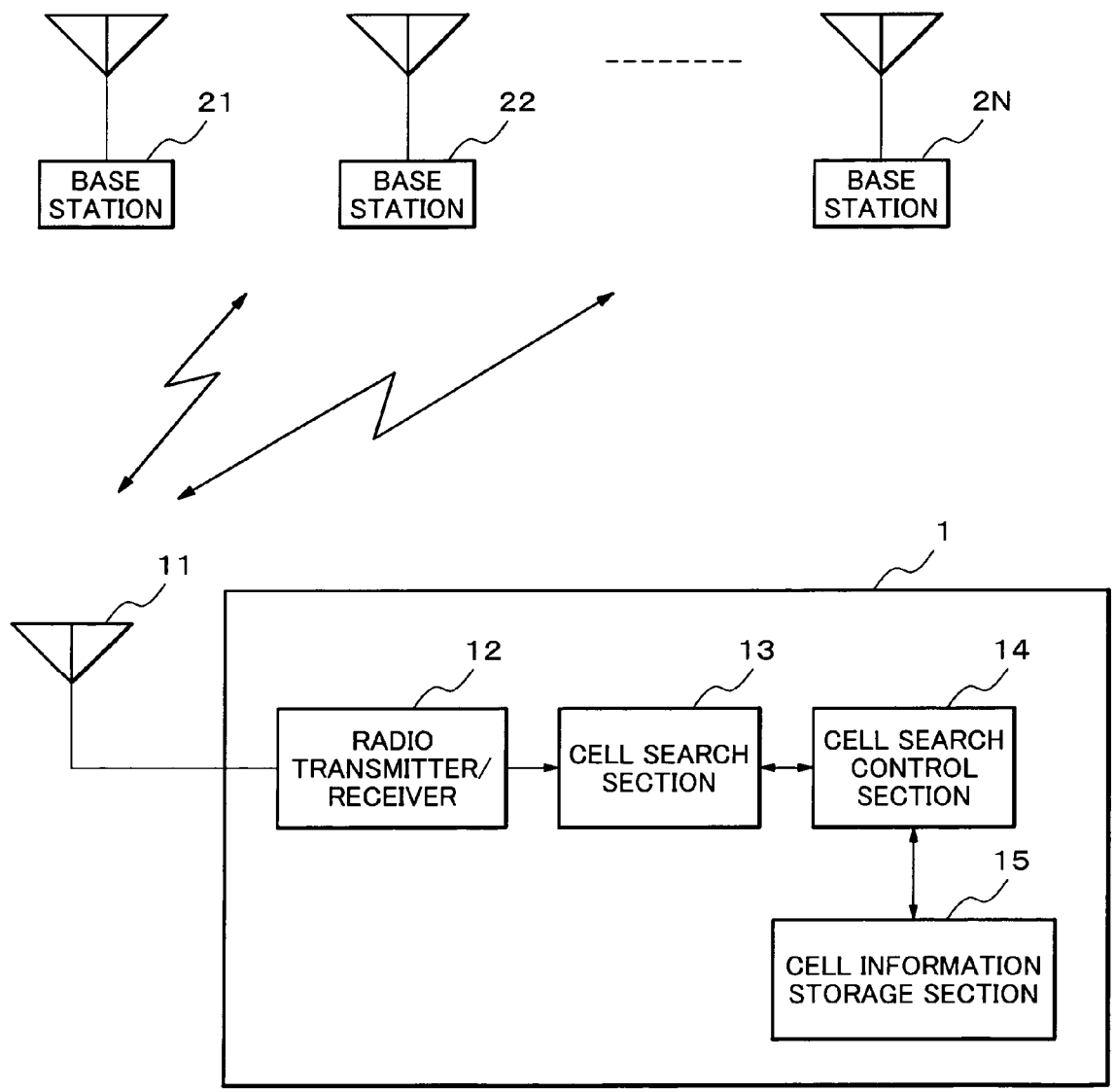
FIG. 2 is a block diagram illustrating a mobile communication terminal according to an exemplary embodiment of the present invention.
Figure 3:
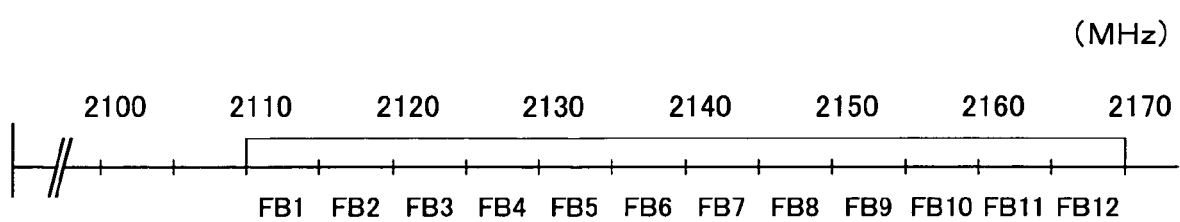
FIG. 3 shows an example of frequency bands that are assigned to networks.

A preferred embodiment of a cell search method and a mobile communication terminal of the present invention will be described below. Referring to FIG. 2, a mobile communication terminal 1 includes an antenna 11, a radio transmitter/receiver 12, a cell search section 13, a cell search control section 14, and a cell information storage section 15. The antenna 11 sends and receives signals to and from a plurality of base stations 21, 22, . . . , 2N. The radio transmitter/receiver 12 modulates and demodulates signals. The cell search section 13 searches a plurality of base stations on the basis of a demodulated received signal to find a given cell (radio zone). The cell information storage section 15 is capable of storing information about networks such as PLMNs and information about frequencies used by the PLMNs. Also, as shown in FIG. 3, the cell information storage section 15 stores 12 frequency bands FB1 to FB12 that are formed by dividing the frequency band from 2110 MHz to 2170 MHz at intervals of 5 MHz. The plurality of frequency bands provide an example of frequency bands that are assigned to networks in a CDMA mobile communication system. The frequencies in the bands correspond to frequencies of signals transmitted from radio base stations to mobile communication terminals. The cell search control section 14 instructs the cell search section 13 to search for a given cell on the basis of data stored in the cell information storage section 15. When the cell search section 13 detects a cell, the cell search control section 14 causes the cell information storage section 15 to store information about that network (PLMN) and about a frequency used by the PLMN. The mobile communication terminal 1 is a communication device such as a cellular phone or PHS, which may include other components (not shown), such as a controller, a microphone, a speaker, a key-input section, and a display.

Figure 4A:
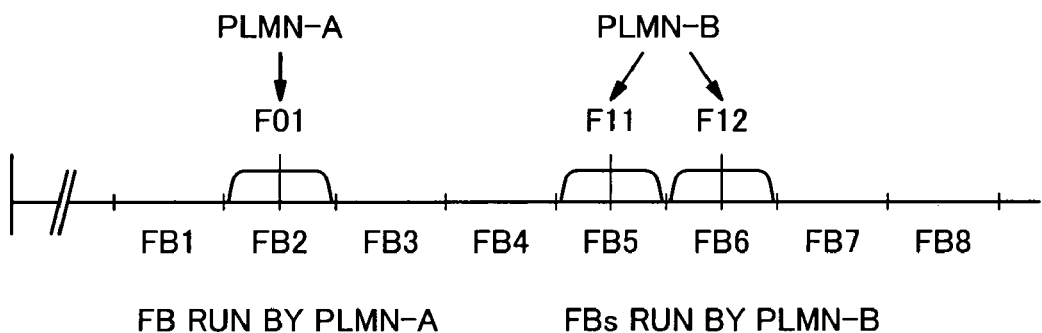
FIGS. 4A and 4B show examples of frequency bands that are used by networks and an example of assignment of priorities to frequency bands to be searched.
Figure 4B:
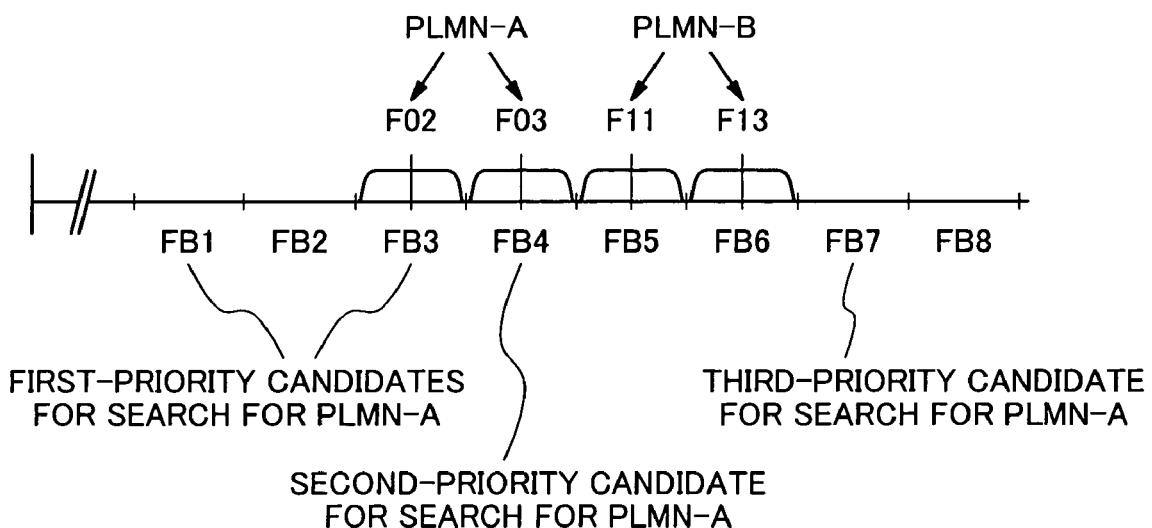

An example of the cell search method of the invention will be described below. FIGS. 4A and 4B show examples of frequency bands used by networks (PLMNs) and examples of frequency bands that are set as search candidates. When the mobile communication terminal 1 is located in the area A shown in FIG. 4A, the mobile communication terminal 1 detects a frequency F01 that is used by the PLMN-A. That is, the mobile communication terminal 1 makes a connection with a cell of the PLMN-A. The cell search control section 14 therefore recognizes that the frequency band FB2, that contains the frequency F01, is a frequency band used by the PLMN-A, and causes the cell information storage section 15 to store the data. Usually, in a mobile communication system that adopts CDMA, frequency bands assigned to a particular common carrier are continuous. The frequency bands FB1 and FB3 that are adjacent to the FB2 used by the PLMN-A can be regarded as frequency bands used by the same PLMN-A. Therefore, the cell search control section 14 can cause the cell information storage section 15 to store the frequency bands FB1 and FB3 as frequency bands used by the PLMN-A.

In the area B shown in FIG. 4B, the PLMN-A uses frequency bands FB3 and FB4. When the mobile communication terminal 1 moves to the area B, the cell search section 13 cannot connect to the PLMN-A by detecting F01. However, the cell search section 13, controlled by the cell search control section 14, preferentially searches for frequencies within the frequency bands FB1 and FB3 stored in the cell information storage section 15, thereby quickly detecting a frequency F02 used by the PLMN-A in the area B. Also, the frequency band FB4 adjacent to the frequency band FB3 can be a frequency band used by the PLMN-A. The cell search control section 14 can previously store in the cell storage section 15 the frequency band FB4 as a second-priority frequency band to be searched. This enables the cell search section 13 to detect the frequency F03 in a short time by searching the FB4 used by the PLMN-A in the area B.

The mobile communication terminal 1 may detect frequency F11 or F12 in the area A and recognize that these frequencies belong to the PLMN-B. Then, the cell search control section 14 recognizes that the frequency bands FB5 and FB6 that contain these frequencies are frequency bands used by the PLMN-B. The cell search control section 14 then causes the cell information storage section 15 to store the recognized information. Also, the cell search control section 14 judges that the PLMN-A, the target of connection, does not use the frequency bands FB5 and FB6. Therefore, the cell search control section 14 controls the cell search section 13 to skip FB5 and FB6 when searching for a cell that belongs to the PLMN-A. Alternatively, FB5 and FB6 may be assigned the lowest priority for a search. The cell search control section 14 causes the cell information storage section 15 to store the information about FB5 and FB6. Since FB5 is adjacent to FB4, FB5 can be a candidate for a search for a cell of the PLMN-A. However, because FB5 and FB6 were judged as frequency bands used by the PLMN-B, the cell search control section 1-4 may set the frequency band FB7 as a third-priority candidate for a search for a cell of the PLMN-A.

Figure 5:
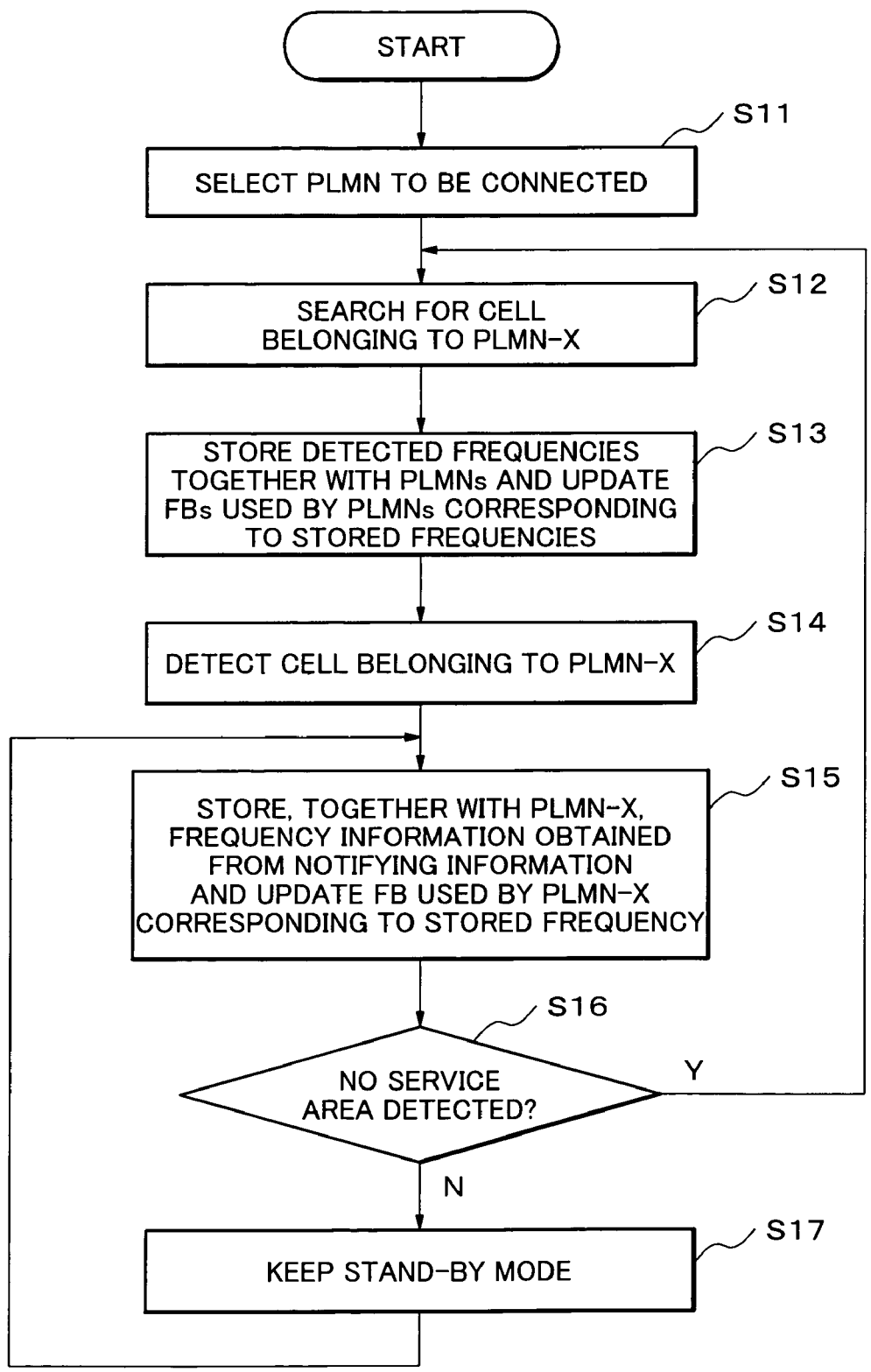
FIG. 5 shows an operational example of the mobile communication terminal of an exemplary embodiment of the invention.

An operational example of the mobile communication terminal 1 will be described below. FIG. 5 shows an operational example of the terminal 1 that is performed from when a cell search is started to when the terminal 1 becomes ready to start communication. After the terminal 1 is turned on, the user specifies a PLMN and the cell search control section 14 of the terminal 1 accordingly selects a PLMN-X as a target of connection (S11). Next, the cell search section 13 performs a search for a cell that belongs to the selected PLMN-X (S12). During the cell search, the terminal 1 may detect a plurality of frequencies and a plurality of PLMNs. The cell search control section 14 stores the detected frequencies and information about the PLMNs in the cell information storage section 15 (S13). The cell search control section 14 stores the frequencies while avoiding overlap, and updates information about the frequency bands (FBs) used by the PLMNs corresponding to the stored frequencies (S13). As a result of the cell search (S12), the terminal 1 detects a cell that belongs to the selected PLMN-X (S14).

When the terminal 1 is in a stand-by mode and located in a cell of the PLMN-X, the cell search control section 14 receives notifying information sent from a radio base station and stores information about the PLMN-X and its frequency in the cell information storage section 15 (S15). Also, the cell search control section 14 stores the frequency while avoiding overlap and updates information about the frequency band (FB) used by the PLMN-X corresponding to the stored frequency (S15).

When the terminal 1 is in a no service area (YES in S16), the terminal 1 performs a cell search (S12). On the other hand, when the terminal 1 stays within a service area (when not in a no service area), the terminal 1 keeps the stand-by mode (S17). In reality, the terminal 1 repeats a cell reselecting process. That is, the terminal 1 returns to S15 to obtain cell notifying information again and updates data in the cell storage section 15.

Figure 6:
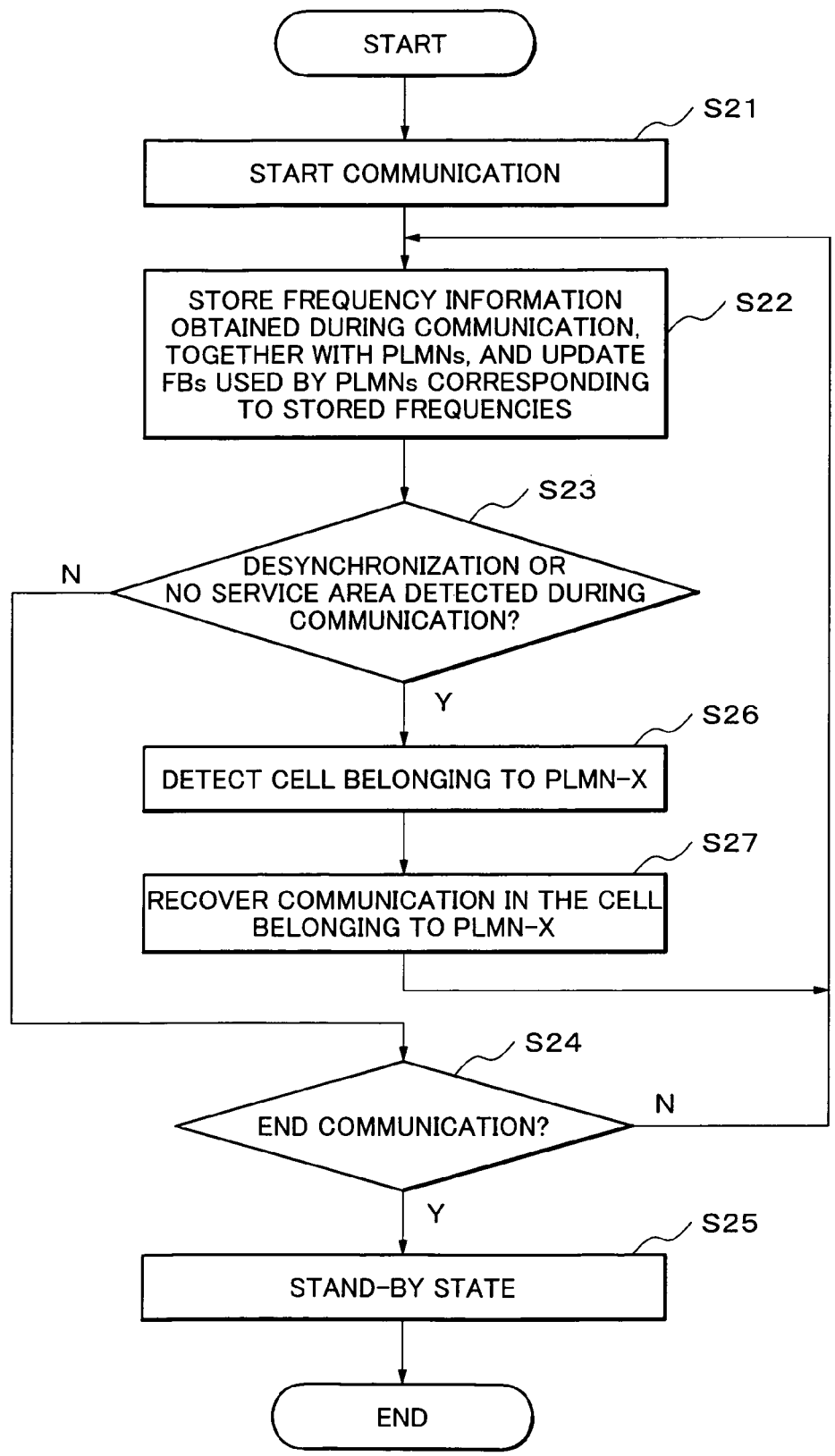
FIG. 6 shows another operational example of the mobile communication terminal of an exemplary embodiment of the invention.

FIG. 6 shows an operational example that is performed from when the mobile communication terminal 1 starts communication in a certain cell to when the mobile communication terminal 1 ends the communication. For example, the terminal 1 starts communication when the terminal 1 is in the stand-by mode within a certain cell of the PLMN-X (S21). During the communication, the cell search control section 14 stores information about obtained frequencies and information about PLMNs that use the frequencies, in the cell storage section 15 (S22). The cell search control section 14 stores frequencies while avoiding overlap and updates information about frequency bands (FBs) used by the PLMNs corresponding to the stored frequencies (S22). When the cell search section 13 detects "state being out of radio synchronization" or "no service area" during communication (YES in S23), the cell search control section 14 searches for the cell of the PLMN-X that was connected immediately before (S26) and recovers the communication (S27). When the cell search section 13 detects neither "state being out of radio synchronization" nor "no service area" (NO in S23), it is checked whether to continue or end the communication (S24). When the communication is to be ended (YES in S24), the terminal 1 returns to the stand-by mode (S25).

Figure 7:
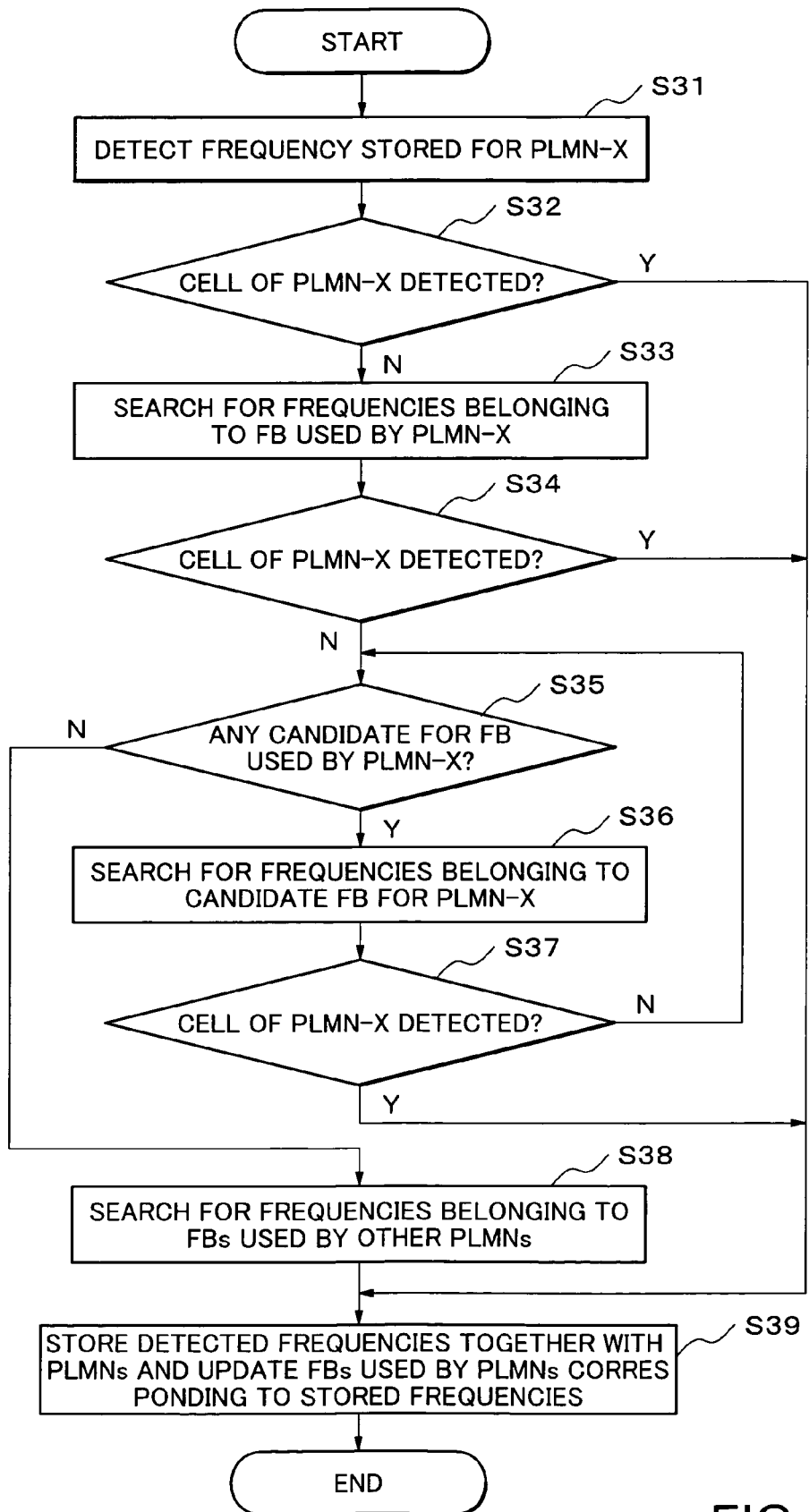
FIG. 7 shows still another operational example of the mobile communication terminal of an exemplary embodiment of the invention.

FIG. 7 shows an operational example in which the mobile communication terminal 1 stepwise detects a cell that belongs to the PLMN-X. First, the cell search section 14 attempts to detect a frequency stored for the PLMN-X (S31). When the cell search section 14 detects the frequency and detects a cell of the PLMN-X (YES in S32), the cell search control section 14 stores information about the detected frequency and the PLMN-X (S39). The cell search control section 14 stores frequencies while avoiding overlap and updates information about the frequency band (FB) of the PLMN-X (S39). When no cell belonging to the PLMN-X is detected, i.e., when such a frequency as mentioned above is not detected (NO in S32), the frequencies within the frequency band (FB) that contains that frequency, used by the PLMN-X, are searched (S33). When no cell belonging to the PLMN-X is detected (NO in S34), it is checked whether there is a candidate for a frequency band used by the PLMN-X (S35). As already described, a frequency band that is adjacent to an already searched frequency band used by the PLMN-X is a first-priority search candidate. Also, a frequency band that is further adjacent to the first-priority candidate frequency band is a second-priority search candidate. Furthermore, a frequency band that is further adjacent thereto can be a third candidate. When there is a candidate for a frequency band to be searched, the cell search section 13 searches the candidate frequency band (S36). When the cell search section 13 detects no cell belonging to the PLMN-X, the flow returns to S35 to search another frequency band that is set as a candidate (NO in S37). When there is no candidate for a frequency band to be searched (NO in S35), the cell search section 13 searches frequency bands that belong to other PLMNs (S38). Frequencies detected in S38 are all stored in the cell storage section 15 together with information about the PLMNs. The cell search control section 14 stores frequencies while avoiding overlap and updates frequency bands (FBs) used by the PLMNs corresponding to the stored frequencies (S39), whereby the process is ended. The search process shown in FIG. 7 is applicable to S12 of FIG. 5 and S26 of FIG. 6.

Figure 8:
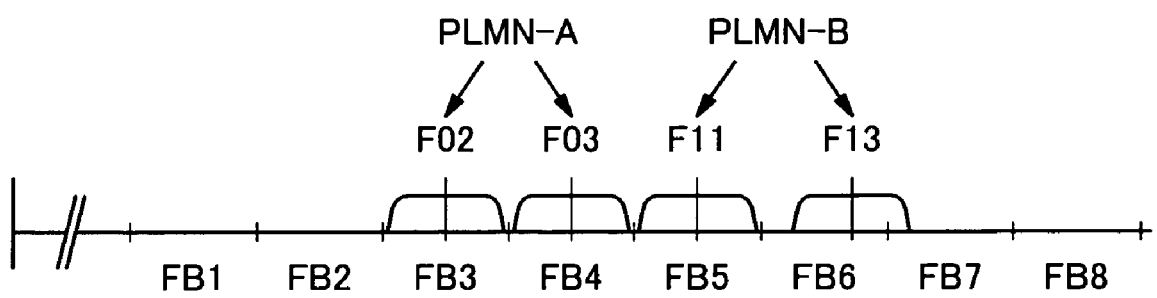
FIG. 8 shows an example of a frequency band that is set on the basis of a spread frequency.

In the above-mentioned embodiment, the cell search control section 14 selects, or updates, a frequency band (FB) detected under a given condition as a frequency band (FB) used by a desired PLMN. In this case, the frequency band is a frequency band (FB) that is previously set and stored as shown in FIG. 3. However, operated frequencies are spread in a CDMA mobile communication system. As exemplified in FIG. 8, a detected frequency F13 is not located in the center of the predetermined frequency band FB6. The cell search control section 14 is capable of selecting and storing the frequency band that contains the frequency F13 as the center frequency, e.g., with a bandwidth of 5 MHz, as a frequency band used by the PLMN.

According to the present invention, when a mobile communication terminal searches for a cell that belongs to a particular network, the mobile communication terminal searches for frequencies on the basis of predetermined priorities. This makes it possible to quickly detect a cell belonging to a particular network (PLMN), which reduces power consumption of the terminal.

While the present invention has been described in connection with certain preferred embodiment, it is to be understood that the subject matter encompassed by the present invention is not limited to those specific embodiments. On the contrary, it is intended to include all alternatives, modifications, and equivalents as can be included within the spirit and scope of the following claims.

Further, it is the inventor's intent to retain all equivalents of the claimed invention even if the claims are amended during prosecution.

What is claimed is:

1. A cell search method in a mobile communication terminal to be used in an environment in which a plurality of common carriers run respective networks using different frequency bands within a specified range of frequencies, the method comprising:

searching for a plurality of cells to find a cell of a desired network;

storing first frequency band information together with corresponding network information having been searched during finding the cell of the desired network;

determining each frequency band among the specified range of frequencies whose band allocation is continuing and adjacent to the first frequency band information corresponding to the cell of the desired network as second frequency band information for selection;

assigning a high priority to the second frequency band information, and storing the second frequency band information together with the assigned high priority; and finding a frequency included in the second frequency band information according to the assigned high priority when the frequency being used in the desired network is lost.

2. The cell search method according to claim 1, further comprising:

assigning the lowest priority to the first frequency band information which belongs to other networks than the desired network; and skipping a search for the first frequency band information assigned with the lowest priority when finding a frequency to be used in the desired network.

3. A mobile communication terminal to be used in an environment in which a plurality of common carriers run respective networks using different frequency bands within a specified range of frequencies, comprising:

a transmitter/receiver for communicating with a base station via an antenna;

a cell search section for searching for a plurality of cells to find a cell of a desired network;

a cell information storage section for storing first frequency band information together with corresponding network information having been searched by the cell search section during finding the cell of the desired network; and a cell search control section for determining each frequency band among the specified range of frequencies whose band allocation is continuing and adjacent to the first frequency band information corresponding to the cell of the desired network as second frequency band information for selection, and instructing the cell information storage section to store the second frequency band information together with a given priority; and wherein the cell search control section instructs the cell search section to find a frequency included in the second frequency band information in accordance with the given priority when the frequency being used in the desired network is lost.

4. The mobile communication terminal according to claim 3, wherein, the cell search control section gives the lowest priority to the first frequency band information which belongs to other networks than the desired network, and instructs the cell search section not to search the first frequency band information giving with the lowest priority when finding a frequency to be used in the desired network.

* * * * *